Feb. 10, 1948.　　　W. P. HEYDORN　　　2,435,781
RECOVERY OF VOLATILE SOLVENTS
Filed April 30, 1945
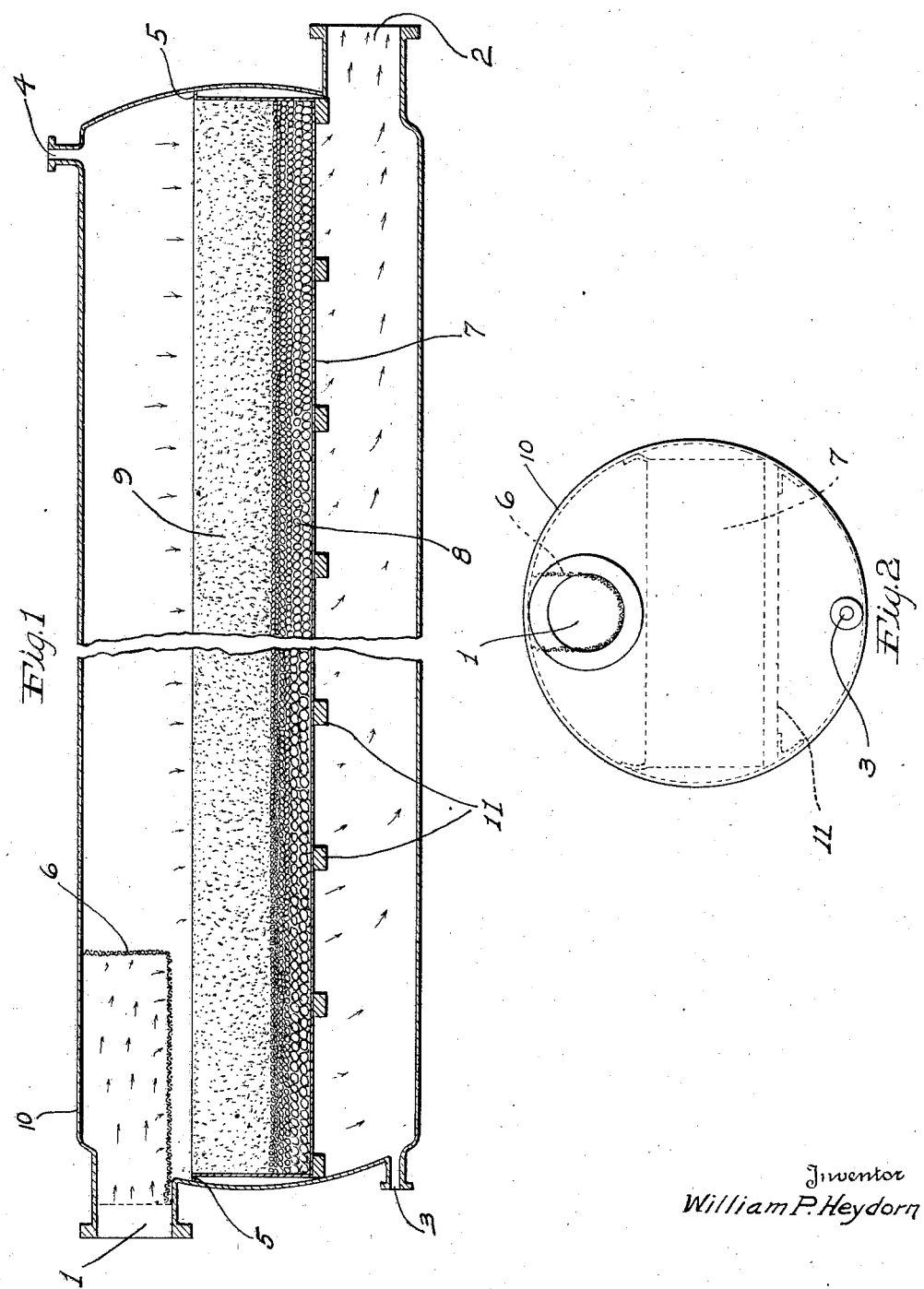
Inventor
William P. Heydorn
By
R. H. Waters
Attorney Patented Feb. 10, 1948

2,435,781

UNITED STATES PATENT OFFICE 2,435,781

RECOVERY OF VOLATILE SOLVENTS

William P. Heydorn, Akron, Ohio, assignor to Wingfoot Corporation, Akron, Ohio, a corporation of Delaware Application April 30, 1945, Serial No. 591,108

7 Claims. (Cl. 183—49)

This invention relates to a method of recovering volatile solvent vapors from air or other gas mixtures. It particularly relates to a method of preventing corrosion in solvent recovery apparatus, especially when used to separate chlorine-substituted hydrocarbons from air by an adsorption technique.

In the conventional solvent recovery practice, the air or other gas containing small amounts of the volatile organic solvent is passed through a porous body of activated carbon which adsorbs the molecules of organic solvent. After the activated carbon is saturated, the adsorbed vapors are evolved by heating or steaming the carbon and the concentrated vapors thereby obtained are condensed by cooling. The activated carbon beds, which may be several inches to two or three feet in thickness, are generally disposed in a horizontal position and the air passed downwardly through the relatively thin layers of carbon to minimize the resistance to the passage of the gas stream. The bed is usually supported in a closed chamber and the air stream directed in such a manner so that all of the gas is passed through the body of carbon. It is customary to support the activated carbon bed with thin metal plates, preferably of a corrosion-resistant metal, such as Monel. The metal plate is supported by structural members of the same or similar corrosion-resistant metal. The organic solvents are corrosive, especially at the normal adsorbing temperature of 100 to 150° F. The activated carbon appears to catalyze the corrosion and the intermittent steaming further promotes the oxidation of the metallic structures. In ordinary practice it is frequently necessary to repair or replace the supporting plate after ten days of continuous operation.

The principal object of this invention is to provide an economical method of recovering volatile solvents by adsorption on activated carbon through the elimination of the frequent interruptions of operation for replacing the carbon-supporting structures. A further purpose of the invention is to minimize the loss of activated carbon by the passage of carbon through the perforated plate, especially after the perforations are enlarged by corrosion.

In accordance with this invention, the activated carbon is supported by a porous layer of integral shapes of an inert non-absorptive material which offers little resistance to the passage of the gases being stripped of solvent vapors. The said porous layer is supported by the perforated plate or grating containing interstices smaller than the diameter of the integral shapes in the lower part of the porous bed. Thus, the activated carbon is supported without contacting the metal grating. A preferred modification of the invention involves the use of a porous bed containing integral shapes of stoneware or ceramic material which vary in size from large shapes at the bottom to shapes approximately the size of the activated carbon granules at the top. The graduated bed provides a rigid support for the activated charcoal without permitting the carbon particles to fall through and contact the metallic supporting structures. If desired the thin metal plate may be entirely eliminated and a coarse grating, having openings slightly smaller than the integral stoneware shapes at the bottom of the porous bed, used to support the adsorbing bed.

Many types of packing are available commercially in various sizes. For example, Berl saddles or Raschig rings may be advantageously used for the lower part of the porous layer. The uppermost layers may utilize granular materials of approximately the size and shape of the activated carbon granules. If desired, the first layer of activated carbon may be of larger particle size, thereby avoiding the necessity of using a granular non-adsorbing material. A very effective adsorbing bed may be prepared by using three different sizes of Berl saddles ranging from 1½" to ½" in size, superposed with about a one-inch layer of a very coarse activated carbon having a particle size of about ¼" to ½" in diameter. Such a porous bed will support the commercial adsorbing carbon without permitting any to filter through to the metal structure.

The nature of the corrosion is not fully understood, but is believed to be an electrolytic phenomenon, probably induced by the contact of dissimilar materials in the presence of an electrolyte.

Fig. 1 is a longitudinal section of the apparatus employed.

Fig. 2 is an end view of the same.

The accompanying drawing demonstrates one method of practicing the invention. The adsorptive bed is entirely enclosed within a container 10 into which the gas to be stripped is passed through gas inlet 1 into a diffuser 6 which insures an even distribution within the container 10. The activated carbon bed 9 is superposed on the inert porous bed 8 which rests on the perforated plate or grating 7. The entire structure rests on a series of parallel bars 11. The space between the container walls 10 and the adsorbing bed are sealed by structures 5 which direct all gases downwardly through the carbon bed 9, the inert porous layer 8 and the supporting plate or grating 7. The air or other gas stripped of solvent vapors is drawn off through the exit 2. The adsorber is provided with a steam inlet 3 for the purpose of desorbing the carbon. The vent 4 is used to draw off the desorbed solvent, and steam which are condensed and the immiscible liquids separated from each other.

If desired, the apparatus may be used by introducing the solvent-laden gases through opening 2, passing them upwardly through the metallic grating 7, the porous layer 8, the activated carbon bed 9 and out through opening 1.

Further details of a specific method of operating the new invention will be apparent from the following example.

Sixteen thousand cubic feet per minute of air containing small proportions of ethylene dichloride was passed through a bed of 10,000 lbs. of activated carbon, 7′ 6″ in width and 28′ 9″ in length and about 18 to 20 inches in thickness. The carbon was supported by a perforated Monel metal plate containing in successive layers three inches of 1½″ Berl saddles, one inch of 1″ Berl saddles, one inch of ½″ Berl saddles and one inch of 2 to 4 mesh activated charcoal. The bed became saturated with solvent in 50 minutes. Upon steaming and condensing, approximately one hundred gallons of liquid diethylene chloride were recovered, representing 85% of the solvent in the air stream. After six months of continuous operation, the adsorbing structure was examined and found to require no repairing.

A previously used structure, in which the granular activated charcoal rested upon the perforated Monel metal plate without the intervening layer of non-adsorbent shapes, required the first repairs after ten days of use and subsequent repairs at the rate of about two to three per week until at the end of sixty days the entire supporting structure had to be replaced.

Although the invention has been described with respect to a specific example, it is not intended that the details thereof shall be construed as limitations on the scope of the invention except to the extent included in the following claims.

I claim:
1. An adsorbing bed for the recovery of volatile organic liquid vapors which comprises a horizontally disposed metallic member having a plurality of transverse apertures therein, a porous layer of integral shapes of a ceramic material superposed on said metallic member and a layer of granular activated carbon superposed on said porous layer of integral shapes.

2. An adsorbing bed for the recovery of volatile organic liquid vapors which comprises a horizontally disposed metallic plate having a plurality of uniformly spaced apertures therein, a porous layer of shapes of ceramic superposed on said plate, and a layer of granular activated carbon superposed on said porous layer, said porous layer being comprised of integral shapes of a ceramic material and graduated in size from slightly larger than said apertures at the plate to approximately the size of the activated carbon granules at the surface in contact with the carbon.

3. An adsorbing bed for the recovery of volatile organic liquid vapors which comprises a metallic grating, a layer of integral shapes of an inert material superposed on said grating, the integral ceramic shapes being of a size and shape that will not pass through the interstices of the grate, a layer of smaller integral ceramic shapes of an inert material superposed on the said first layer, and a layer of granular activated charcoal superposed on said layer of smaller integral shapes.

4. An adsorbing bed for the recovery of volatile organic liquid vapors which comprises a body of granular activated carbon horizontally disposed on a supporting structure having a metallic grating, a porous layer of ceramic shapes superposed on said grating and a layer of activated carbon of a particle size two to five times the average diameter of the particles in the said body of granular activated carbon superposed on the said porous layer, said porous inert layer being comprised of integral shapes graduated in size from the shapes in contact with the grating which are large enough to be retained on the metallic grating to shapes in the upper surface of the said porous inert layer which are small enough to provide adequate support for the particles of larger sized activated carbon.

5. In an adsorption bed for the recovery of volatile organic liquid vapors having a body of granular activated charcoal supported by a metallic screen, the improvement which consists in a layer of integral shapes of ceramic material inserted between the body of activated carbon and the metal screen.

6. In an adsorption bed for the recovery of vapors of chlorine-substituted hydrocarbons, which bed is comprised of a body of granular activated carbon supported by a metallic screen, the improvement which consists in a layer of integral shapes of ceramic material between the body of activated carbon and the metallic screen.

7. In an adsorption bed for the recovery of vapors of chlorine-substituted hydrocarbons, which comprises a horizontally disposed metallic member having a plurality of transverse apertures therein, a porous layer of integral shapes of ceramic material superposed on said metallic member, and a layer of granular activated carbon superposed on said porous layer of integral shapes.

WILLIAM P. HEYDORN.

REFERENCES CITED

The following references are of record in the file of this patent:

UNITED STATES PATENTS

| Number | Name | Date |
|---|---|---|
| 933,097 | McArthur | Sept. 7, 1909 |
| 1,577,200 | Voress et al. | Mar. 16, 1926 |

FOREIGN PATENTS

| Number | Country | Date |
|---|---|---|
| 579,024 | Germany | June 20, 1933 |

Certificate of Correction

Patent No. 2,435,781.  February 10, 1948.

WILLIAM P. HEYDORN

It is hereby certified that error appears in the printed specification of the above numbered patent requiring correction as follows:

Column 3, line 61, claim 2, after the word "ceramic" insert *material*; and that the said Letters Patent should be read with this correction therein that the same may conform to the record of the case in the Patent Office.

Signed and sealed this 1st day of March, A. D. 1949.

[SEAL]

THOMAS F. MURPHY,
*Assistant Commissioner of Patents.*